UNITED STATES PATENT OFFICE.

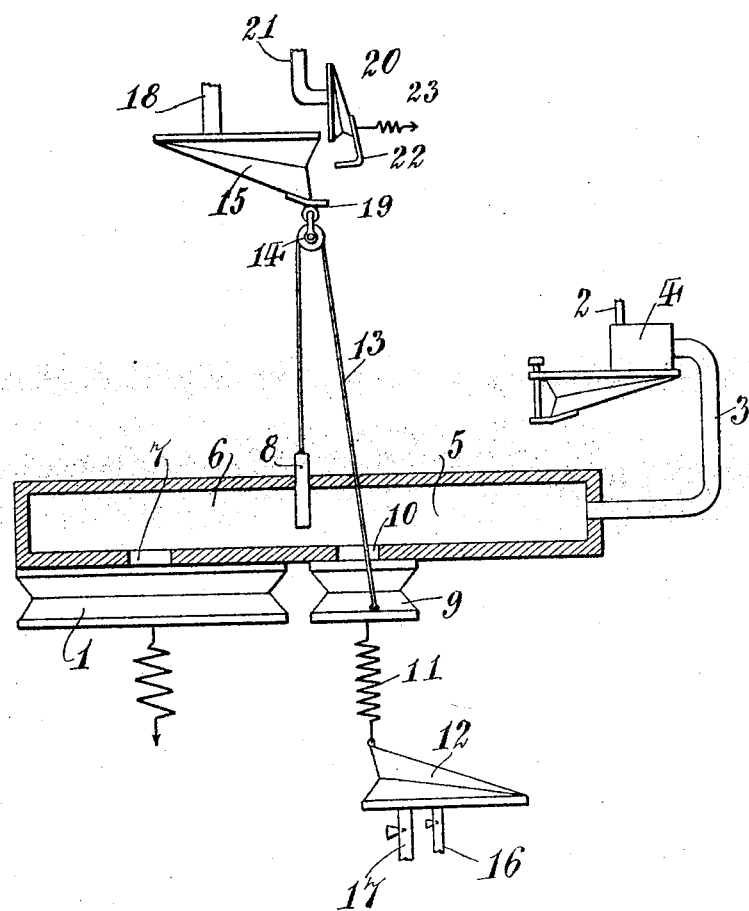

CHARLES F. STODDARD, OF NEW YORK, N. Y., ASSIGNOR TO AMERICAN PIANO COMPANY, OF NEW YORK, N. Y., A CORPORATION OF NEW JERSEY.

EXPRESSION MECHANISM FOR MUSICAL INSTRUMENTS.

1,409,488.     Specification of Letters Patent.     Patented Mar. 14, 1922.

Application filed October 3, 1916, Serial No. 123,463. Renewed December 19, 1921. Serial No. 523,587.

*To all whom it may concern:*

Be it known that I, CHARLES F. STODDARD, a citizen of the United States, residing in the city of New York, county and State of New York, have invented an Improvement in Expression Mechanism for Musical Instruments, of which the following is a specification.

This invention relates to apparatus for automatically varying playing intensities in automatic musical instruments, such, for instance, as player-pianos and the like.

Among other objects, the invention is intended to provide apparatus capable of producing prompt changes in playing intensity while maintaining intensities so far as may be desired, regardless of the number of tones sounded.

The character of the invention may be readily understood by reference to the accompanying drawings which show diagrammatically one illustrative embodiment thereof.

In the drawings, a bellows 1 exemplifies a main source of power for operating the playing pneumatics which may be operated selectively, as well understood by those skilled in the art, from a tracker board through ducts 2. A duct 3 connects the action chest 4 of the player action with a wind chest 5. A wind chest 6 communicates with the main source of power through an unobstructed port 7 and communication between the wind chest 6, which may be termed the high exhaust chest, and wind chest 5, which may be termed regulated exhaust chest, is controlled by a valve 8. As well understood in the art, the regulator valve 8 regulates the flow of air from the action chest 4 to the source 1.

Means are herein provided to control the regulator valve to secure variations in regulation and in playing intensities by way of crescendos and diminuendos and by substantially distinct steps. A regulator pneumatic 9 is in free communication with wind chest 5 through a port 10 and is provided with a regulator spring 11 which connects the movable board of the regulator pneumatic 9 with the movable board of an expression pneumatic 12. An operative connection is provided between the regulator bellows 9 and the regulator valve 8, by a flexible cable 13, which, in the illustrative embodiment shown in the drawings, passes upwardly over a pulley 14 fast to the movable board of a second expression pneumatic 15. It will therefore be apparent that any movement of the regulator pneumatic will be communicated to the regulator valve 8, unless counteracted by movement of the second expression pneumatic.

Under normal conditions when both expression pneumatics are inactive the degree of exhaust in the regulated wind chest 5 will depend upon the tension of the spring 11. The expression pneumatic 12 is arranged to be exhausted through a duct 16 preferably having an adjustable bleed by which the capacity of the duct may be diminished so as to cause the pneumatic 12 to collapse slowly and thereby slowly and gradually move the lower end of the spring 11 downwardly in the drawings thereby to increase the pull of the spring upon the regulator pneumatic 9. The effect of this as will be readily understood by those skilled in the art, is to modify the regulation so as to produce a gradual slow crescendo. When atmosphere is admitted through the duct 16, the bellows 12, having been wholly or partially collapsed, is then permitted to expand under the action of the spring 11. Thus the spring 11 returns slowly to or toward its normal position as shown in the drawings thereby producing a slow diminuendo.

The expression bellows 12 may also be exhausted through a duct 17 of greater capacity than the duct 16 to collapse the bellows 12 at a greater speed, but preferably the duct 17 is of such restricted capacity as to collapse the pneumatic 12 to give a crescendo effect similar to, but faster than that produced by exhausting through the duct 16. When atmosphere is re-admitted through the duct 17 a fast diminuendo results.

The second expression pneumatic 15 provides means by which step changes in intensity may be obtained. Assume for the moment that the first expression pneumatic 12 is incapable of movement. The second expression pneumatic 15 may be exhausted through a duct 18 of sufficiently large capacity to permit the pneumatic to be exhausted practically instantaneously to move the pulley 14 very rapidly upward in the drawings. Such movement of the pulley 14 is transmitted to the regulator valve 8 through the flexible cable 13 thereby raising the regulator valve and increasing the opening between the high exhaust chest and the regulated exhaust chest and consequently inaugurating a distinct step of increase in playing intensities.

To provide for a plurality of distinct steps, means are arranged to arrest the collapse of the expression pneumatic 15 intermediate its fully expanded and fully collapsed positions. The movable board of the expression pneumatic 15 carries a lug 19, and a pneumatic 20, arranged to be exhausted through a duct 21, is provided with a stop 22 adapted to be positioned in the path of movement of the lug 19 and to thereby arrest movement thereof when the pneumatic 15 is collapsed through, for example, one half of its total collapsing movement. If therefore the pneumatic 20 is collapsed before the expression pneumatic 15 is exhausted a smaller step of increase in playing intensities will be inaugurated. Conversely, the expression pneumatic 15 may be wholly collapsed to inaugurate the step change of greatest extent, and thereafter the pneumatic 20 may be collapsed and atmosphere admitted to the expression pneumatic 15, whereupon the stop 22 will engage the lug 19, and prevent the expression pneumatic 15 from assuming its full expanded position until atmosphere is again admitted to pneumatic 20 whereupon it will expand under the action of a spring 23 and permit stop 22 to disengage lug 19.

The two expression pneumatics 12 and 15 have been heretofore described as operating independently. As will be readily understood by those skilled in the art the construction and arrangement herein shown permit of conjoint operation to obtain varying combinations of step changes with crescendo and diminuendo changes in playing intensities. For example, if it is desired to accent a note or notes during the progress of a slow crescendo which is inaugurated by exhausting expression pneumatic 12 through duct 16, the step change expression bellows may be wholly or partially collapsed, without interrupting the progress of the crescendo except to produce the desired result. Upon the expansion of the step change bellows the crescendo will continue its normal progress. Similarly with a slow diminuendo and fast crescendos and diminuendos.

The various ducts, 16, 17 and 18 and 21 may be controlled to place them in communication with atmosphere or a source of exhaust, in any practicable manner by any suitable automatic means, preferably controlled by vents in the tracker. For instance, the so-called automatic actions described in Patent No. 1,008,291 may be adapted for this purpose. These automatic actions and valves in themselves form no part of this invention and therefore need not be described or shown herein.

It is to be understood that this invention is not limited to the particular construction, organization and mode of operation shown in the drawings and described for illustration. On the contrary, the invention may be variously embodied and the particular construction may be variously modified within the scope of the subjoined claims. It is not indispensable that all the features of the invention be used conjointly since, in some instances, they may be used separately to advantage.

I claim as my invention:

1. In a musical instrument, the combination of playing pneumatics; a source of power for operating the playing pneumatics; a regulating pneumatic; a valve between said source of power and the playing pneumatics; an expression pneumatic having a resilient connection with the regulating pneumatic for variably tensioning the latter; a flexible cable connecting said regulator pneumatic to said regulator valve; and a second expression pneumatic engaging said flexible cable for varying the operative effect of said regulator pneumatic upon said regulator valve.

2. In a musical instrument, the combination of playing pneumatics; a source of power for operating the playing pneumatics; a valve between said source of power and the playing pneumatics; a regulator having operative connection with said valve; pneumatic means for variably tensioning said regulator pneumatic to produce crescendo effects; and pneumatic means acting upon said connection for varying the operative effect of said regulator pneumatic upon said regulator valve to produce step change effects.

3. In a musical instrument, the combination of playing pneumatics; a source of power for operating the playing pneumatics; a valve between said source of power and the playing pneumatics; a regulator having operative connection with said valve; pneumatic means for increasing the tension on said regulator pneumatic, gradually at a plurality of speeds to produce crescendo effects; and pneumatic means acting upon said connection for varying the operative effect of said regulator pneumatic upon said regulator valve, abruptly to produce step change effects in playing intensities.

4. In a musical instrument, the combination of playing pneumatics; a main source of power for operating the playing pneumatics; a regulating bellows connected with the source of power and the playing pneumatics; a valve between said source and said regulating bellows; a flexible device connected with said valve and regulating bellows; a pulley over which said device runs; means for adjusting the pulley to vary the action of the flexible device with respect to the valve; and pneumatic means for variably tensioning the regulator bellows.

5. In a musical instrument, the combination of playing pneumatics; a main source of power for operating the playing pneumatics; a regulating bellows connected with the source of power and the playing pneumatics; a valve between said source and said regulating bellows; a flexible device connected with said valve and regulating bellows; a pulley over which said device runs; means for adjusting the pulley to vary the action of the flexible device with respect to the valve; and pneumatically operated means for variably tensioning the regulating bellows.

6. In a musical instrument, the combination of playing pneumatics; a main source of power for operating the playing pneumatics; a regulating bellows connected with the source of power and the playing pneumatics; a valve between said source and said regulating bellows; a flexible device connected with said valve and regulating bellows; a pulley over which said device runs; means for adjusting the pulley to vary the action of the flexible device with respect to the valve; and pneumatic means for increasing at a plurality of speeds the tension on said regulating bellows.

7. In a musical instrument, the combination of playing pneumatics; a source of power for operating the playing pneumatics; a regulator having operative connection with a valve between said source of power and playing pneumatics; an expression bellows for variably tensioning the regulator to produce substantially continuous progressional changes in playing intensities; a second expression bellows to vary the operative connection between the regulator pneumatic and the regulator valve to produce step changes in playing intensities without interrupting the action of the first expression bellows.

In testimony whereof, I have signed my name to this specification this twenty-first day of September, 1916.

CHARLES F. STODDARD.